(12) United States Patent
Schaefer et al.

(10) Patent No.: US 9,625,305 B2
(45) Date of Patent: Apr. 18, 2017

(54) ULTRASONIC TRANSIT-TIME FLOWMETER AND METHOD FOR DETECTING A FAILURE IN AN ULTRASONIC TRANSIT-TIME FLOWMETER

(71) Applicant: SIEMENS AKTIENGESELLSCHAFT, Munich (DE)

(72) Inventors: Robert Schaefer, Northport, NY (US); Joseph Chilleme, Saint James, NY (US); Steven Fierro, Kings Park, NY (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 505 days.

(21) Appl. No.: 14/215,911

(22) Filed: Mar. 17, 2014

(65) Prior Publication Data

US 2015/0260556 A1    Sep. 17, 2015

(51) Int. Cl.
*G01F 25/00* (2006.01)
*G01F 1/66* (2006.01)

(52) U.S. Cl.
CPC .......... *G01F 25/0007* (2013.01); *G01F 1/667* (2013.01)

(58) Field of Classification Search
CPC . G01F 1/66; G01F 1/667; G01F 25/00; G01F 25/0007
See application file for complete search history.

(56) References Cited

U.S. PATENT DOCUMENTS

| | | | | |
|---|---|---|---|---|
| 4,308,754 A | * | 1/1982 | Pedersen | G01P 5/247 702/48 |
| 5,329,821 A | * | 7/1994 | Birnbaum | G01F 1/662 73/861.27 |
| 7,117,104 B2 | * | 10/2006 | Urdaneta | G01F 1/66 702/48 |

OTHER PUBLICATIONS

Brassier et al., High-Frequency Transducers and Correlation Method to Enhance Ultrasonic Gas Flow Metering, 2001, Flow Measurement and Instrumentation 12, pp. 201-211.*

* cited by examiner

*Primary Examiner* — Toan Le

(57) ABSTRACT

An ultrasonic transit-time flowmeter and a method for detecting a failure in an ultrasonic transit-time flowmeter are provided. The flowmeter includes a first ultrasonic transducer and a second ultrasonic transducer, wherein the transducers each are configured to transmit and receive signals, wherein the signals are transmitted between the transducers and measurements of transit-times of the signals and a transit-time difference based upon the transit-times are used to calculate a fluid flow velocity. Further, the flowmeter has a first reference element and a second reference element, wherein the first and second reference elements each provide a reference signal, and an electronic controller, wherein a predetermined value is stored in a memory of the controller. A reference value based upon the reference signals is compared with the predetermined value and a failure of the ultrasonic flowmeter is identified based upon a comparison of the reference value with the predetermined value.

12 Claims, 2 Drawing Sheets

ULTRASONIC TRANSIT-TIME FLOWMETER AND METHOD FOR DETECTING A FAILURE IN AN ULTRASONIC TRANSIT-TIME FLOWMETER

FIELD OF INVENTION

An ultrasonic transit-time flowmeter and a method for detecting a failure in an ultrasonic transit-time flowmeter are provided.

BACKGROUND OF INVENTION

A transit-time ultrasonic flowmeter measures the flow velocity of fluids flowing in a conduit by determining the difference in transit time corresponding to ultrasonic signals transmitted upstream and downstream through a fluid flow path. Typically, the transit-time ultrasonic flowmeter includes a first ultrasonic transducer and a second ultrasonic transducer positioned along the fluid flow path. The first and second ultrasonic transducers may be inserted into the conduit (in-line configuration), or alternatively, they may be externally coupled to the outside of the conduit (clamp-on configuration).

An electrical excitation signal is applied to the first transducer which then transmits an ultrasonic signal. The ultrasonic signal travels through the fluid and the second ultrasonic transducer receives the ultrasonic signal and then generates an electrical measurement signal corresponding to the ultrasonic signal. The transit time in one direction is measured. The process is repeated in the other direction with the second ultrasonic transducer acting as a transmitter and the first ultrasonic transducer acting as receiver for measuring the transit time in the reverse direction. Finally, the difference in transit times in the two directions is used to determine the flow velocity of the fluid.

Ultrasonic transit-time flowmeters comprise hardware elements and software elements. Hardware elements, for example are the ultrasonic transducers and the control unit for transmitting, receiving and processing data derived from the ultrasonic signals. The most common implementation of ultrasonic transducers uses a piezoelectric crystal or piezoelectric ceramic. Various other implementations of ultrasonic transducers, such as magnetostrictive ultrasonic are also commonly known. Software elements are for example modules for controlling flow measurements, for generating input signals, for evaluating, converting and storing output signals, for processing signals and data etc.

When an ultrasonic transit-time flowmeter is installed as part of a "Safety Instrumented System" (SIS) it is required that the flowmeter also includes hardware and software measures to ensure the integrity of the flow measurement output, such that the system is able to detect and respond to any failures that may otherwise result in a false flow measurement value.

A number of possible failures in the flowmeter, if undetected, may result in a significant error in the flow measurement accuracy. Such a failure may have severe consequences if a simultaneous failure in a secondary device occurs. For example, the ultrasonic flow meter and a secondary device, for example, a level sensor, both fail, causing a gasoline storage tank to overflow.

Existing diagnostic measures may trap some of the failures by analyzing the actual fluid signal, but not to the level of confidence required for SIS applications.

SUMMARY OF INVENTION

An objective is to provide an ultrasonic transit-time flowmeter that is able to detect and respond to any failure of the hardware or software components of the ultrasonic flowmeter in order to avoid a false flow output value. A further object is to provide a method for an easy and reliable detection of a failure in an ultrasonic transit-time flowmeter.

The objects are achieved with an improved ultrasonic transit-time flowmeter and a method as described in the claims.

The ultrasonic transit-time flowmeter comprises a first ultrasonic transducer and a second ultrasonic transducer, wherein the first and second transducers each are configured to transmit and receive signals. The signals are transmitted between the first and second transducers and measurements of transit-times of the signals and a transit-time difference based upon the transit-times are used to calculate a fluid flow velocity.

The ultrasonic transit-time flowmeter comprises an electronic controller, wherein the first and second ultrasonic transducers are electronically connected to the electronic controller.

Further, the ultrasonic transit-time flowmeter comprises a first reference element and a second reference element, wherein the first and second reference elements each provide a reference signal, and wherein a reference value based upon the reference signals is determined. An electronic controller comprises a predetermined value stored in a memory of the controller, wherein a reference value based upon the reference signals is associated with the predetermined value, in particular compared to the predetermined value. The controller comprises software elements which allow the determination of the reference value based upon the reference signals and to compare the reference value with the predetermined value. A failure of the ultrasonic flowmeter is identified based upon a comparison of the reference value and the predetermined value.

The first and second reference elements may also be called self-verification unit which is used to determine an operating state of the ultrasonic flowmeter. Operating states of the flowmeter in this context are a faultless operating state and a faulty operating state. Faultless operating state means that the flowmeter works properly without errors. Faulty operating state means that an error has occurred within the flowmeter. The self-verification unit is used to verify proper operation of the ultrasonic flowmeter, in particular of the hardware and software components of the flowmeter.

The first and second reference elements each provide a reference signal. Based upon the reference signals, a common reference value is determined, for example calculated. The common reference value is an indicator of the operating state of the flowmeter. The electronic controller is configured to compare the common reference value with the predetermined value already stored in the controller. When the common reference value corresponds to the predetermined value, the flowmeter is working properly and no error or failure has occurred within the hardware and/or software of the flowmeter, i.e. the flowmeter is in a faultless operating state. When the common reference value does not correspond to the predetermined value, for example is below or above the predetermined value, the flowmeter is not working properly and a failure within the software and/or hardware of the flowmeter has occurred.

When the reference signals fail to produce the expected results, which means that the flowmeter is in a faulty operating state, the flowmeter responds by placing its output into an operating state which indicates that a failure has occurred. To place the output of the flowmeter into such an operating state means that the flowmeter will not provide any measurement results or calculation results for a fluid flow velocity. Furthermore, the flowmeter will indicate to the user of the flowmeter, or to an automated control system, that a failure has occurred. For example, the flowmeter may show a warning sign on its display or may provide an alarming sound to the user. The user then knows that the flowmeter is not operating correctly and may exchange or repair the flowmeter device.

The described flowmeter is used to verify proper operation of the hardware and software of the ultrasonic transit-time flowmeter installed as part of a "Safety Instrumented System" (SIS), where personal health and environmental safety are considered to be at greater risk. Additionally, the self-check capability of the flowmeter is enhanced. The reference elements serve as a reference to test and verify the complete hardware and software involved in the flow measurement process.

In a first embodiment, the reference elements are acoustic delay elements, for example piezoelectric crystals bonded to a glass plate or any other delaying medium. A simple acoustic delay element consists of a delay medium and two transducers. The transducers convert electrical signals into mechanical stress, or vice versa, by the piezoelectric effect. The mechanical stress applied to the delay medium travels through a prescribed path as an acoustic wave which in turn applies a mechanical stress on the output transducer to reproduce the electrical signal.

The acoustic delay elements each have a different delay time. The first acoustic delay element may have a delay time for example of 63 μsec. The second acoustic delay element may have a delay time for example of 126 μsec. However, the acoustic delay elements may have any other delay time or could even have the same delay time.

The acoustic delay elements are operated in an alternating manner such that the reference signals are provided in an alternating manner. The provided reference signals are delayed analog signals which have traveled through the acoustic delay elements. Before using and operating the delay elements, a time difference between the delay times (delta-time) of the elements is determined and set as the predetermined value. In the example described above, the delta-time is 63 μsec. When the delay elements are in operation and signals are delayed and no failure/error has occurred within the flowmeter, then the flowmeter is working properly and the reference value based upon the reference signals corresponds to 63 μsec. In case, as another embodiment, the delay elements comprise the same delay time, the time difference would be 0. If, during operation, the reference signals do not produce the expected reference value (which equals the predetermined value), a failure has occurred within the flowmeter.

The first and second reference elements may be located inside an enclosure of the flowmeter. This alternative can be used when manufacturing new ultrasonic flowmeters.

In another alternative, the reference elements may be housed in a separate enclosure outside the enclosure of the flowmeter, but are electronically and/or mechanically connected to the flowmeter, in particular to the electronic controller of the flowmeter. This alternative can be used in order to upgrade already existing flowmeters with reference elements (retrofitting).

In another embodiment, the reference elements may be electronic delay elements producing an electronic time delay. The electronic delay elements may be part of the software, for example the electronic circuit, of the ultrasonic flowmeter. The software may be configured such that the electronic circuit is able to recreate the actual transmit signal used by the flowmeter transducers for the fluid flow measurements. The electronic delay is embodied for example within an electronic delay circuit, which is a sub-circuit of the electronic circuit of the flowmeter, using capacitors or resistors. One of ordinary skill in the art knows and understands how to create an electronic time delay. The recreated signal is then routed through the sub-circuit and a delay time of the signal is measured. Again, if the measured delay time and/or a time difference correspond(s) to a predetermined reference value, the flowmeter is working properly.

The claimed method for detecting a failure in an ultrasonic transit-time flowmeter comprises providing a first and second ultrasonic transducer, wherein the first and second transducers are each configured to transmit and receive signals, wherein measurements of transit-times of the signals transmitted between the first and second transducers and a transit-time difference based upon the transit-times are used to calculate a fluid flow velocity. A predetermined value, for example a numerical value, is stored in a memory of an electronic controller. The first and second ultrasonic transducers are connected to the electronic controller. Reference signals are provided by a first reference element and a second reference element and a reference value based upon the reference signals is determined. The reference value is compared with the predetermined value, and an error within the ultrasonic flowmeter is identified based upon a comparison of the reference value and the predetermined value.

The reference signals are provided by acoustic delay elements, wherein the reference signals are provided at outputs of the acoustic delay elements with a time delay. Acoustic delay elements, for example piezoelectric crystals bonded to a glass plate, are an inexpensive and simple solution for providing the reference signals and the reference value. When the reference value fails to correspond to the predetermined value, an output of the ultrasonic flowmeter is placed into an operating state which indicates that a failure has occurred within the flowmeter, i.e. within the software and/or hardware components of the flowmeter.

As described before, in an embodiment, the reference signals are provided by acoustic delay elements, wherein the reference signals are provided at outputs of the acoustic delay elements with a time delay. Each acoustic delay element comprises a different delay time, wherein a time difference between the different delay times of the delay elements is stored as the predetermined value.

The claimed method further comprises that the reference signals are provided in an alternating manner by operating the acoustic delay elements in an alternating manner, determining transit times of the reference signals, determining a time difference based upon the transit times of the reference signals, wherein the time difference is compared to the predetermined value.

In another embodiment, the reference elements produce an electronic time delay, wherein a sub-circuit of an electronic circuit of the electronic controller of the flowmeter is configured to produce the electronic time delay.

DETAILED DESCRIPTION OF INVENTION

Figure 1:
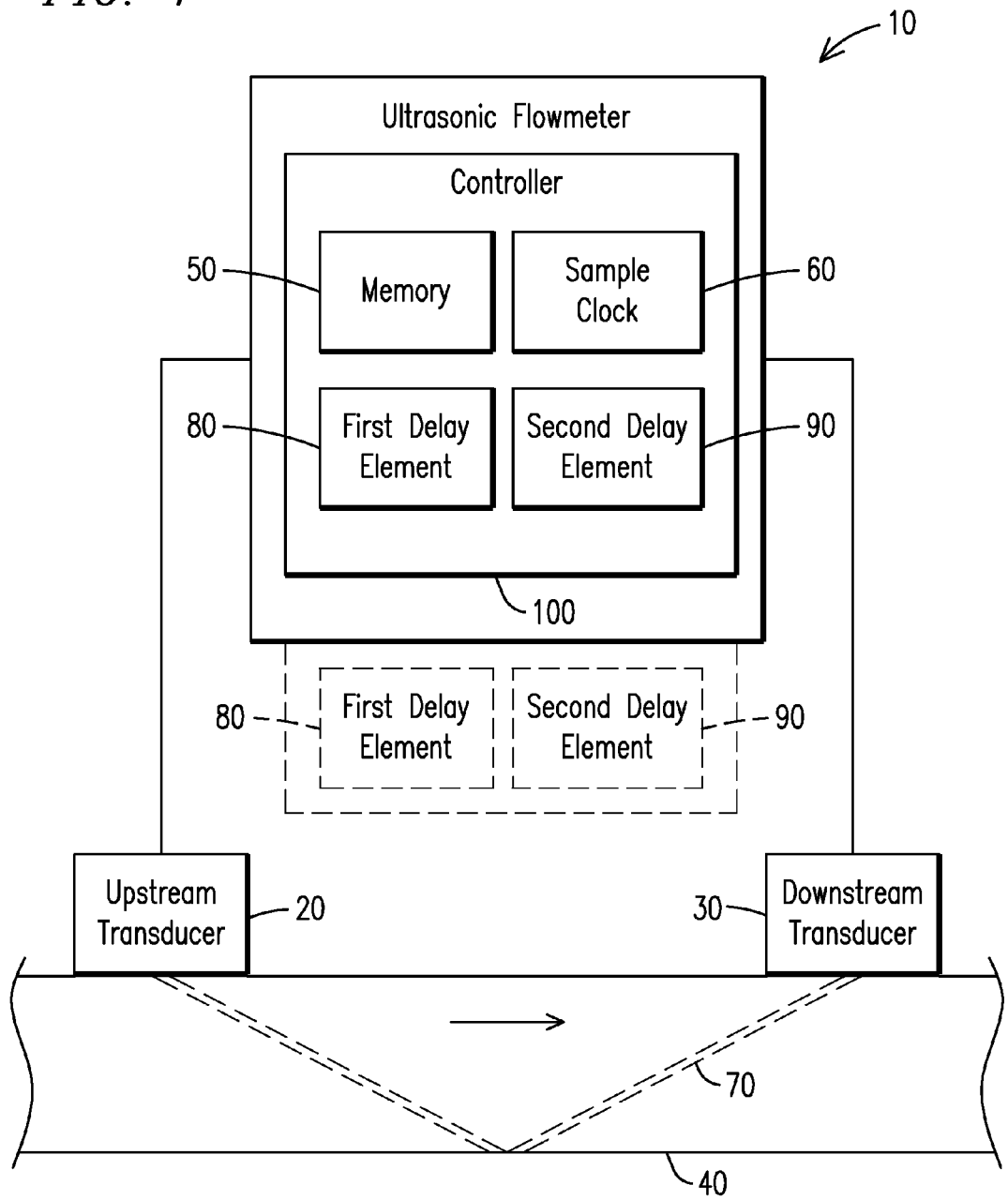
FIG. 1 shows a schematic representation of an ultrasonic transit-time flowmeter.

FIG. 1 shows a schematic view of an ultrasonic transit-time flowmeter in a first embodiment.

The flowmeter 10 is a non-invasive ultrasonic flowmeter (clamp-on configuration) of known construction and operation coupled to the pipe exterior 40. The flowmeter 10 has an upstream transducer 20 and a downstream transducer 30 that are physically separated a known distance and coupled to an electronic flowmeter controller 100 that includes software stored in memory 50 and a sample clock 60, for example a crystal oscillator with an Analog-to-Digital Converter (ADC). The electronic controller 100 controls the flowmeter 10. The electronic controller 100, implementing the software stored in memory 50, causes the upstream transducer 20 to send an ultrasonic signal 70 through fluid in the pipe 40 at a rate established with the sample clock 60. The reflected signal from upstream transducer 20 is detected by the downstream transducer 30. The direction is then reversed such that the downstream transducer 30 sends an ultrasonic signal to the upstream transducer 20. As is known by those skilled in the art, the time difference between each direction of transmission and the individual time delays from transmission to receipt of the ultrasonic signals can be correlated to both sound velocity and flow velocity of the fluid in the pipe 40. Data processing and analysis takes place within the controller 100.

According to the embodiment of FIG. 1, the flowmeter 10 further comprises two delay elements 80 and 90. The delay elements 80 and 90 are separate components. As FIG. 1 shows, the elements 80 and 90 are located inside a housing of the flowmeter 10, in particular within the electronic controller 100. But the elements 80 and 90 can also be located outside the flowmeter device 10 as shown by the elements 80 and 90 with broken lines. In this case, the elements 80 and 90 can be carried by the flowmeter device 10 and have a mechanical connection to the flowmeter 10. Alternatively, the elements 80 and 90 can comprise a separate housing which is connected to the housing of the flowmeter 10. The delay elements 80 and 90 comprise one or more electronic connections to electronic components of electronic circuits of the controller 100 as will be described later.

A number of possible failures in the flowmeter, if undetected, may result in a significant error in the flow measurement accuracy. Such a failure may have severe consequences if a simultaneous failure in a secondary device occurs. For example, the ultrasonic flow meter and a secondary device (for example a level sensor) both fail, causing a gasoline storage tank to overflow.

Possible failures along with the associated consequences may be:
Failure: Sample clock frequency is incorrect.
Consequence: Wrong transmit frequency resulting in a lower signal and/or poor transducer resonance, error in the measured transit-time resulting in an inversely proportional flow error, delta-time measurement error resulting in a proportional flow error.
Failure: Upstream/Downstream multiplexer fails.
Consequence: No delta-time is measured even though fluid is flowing through the pipe.
Failure: Path selection multiplexer fails (for a multipath flowmeter).
Consequence: Signals from more than one path may superimpose on each other, giving in incorrect flow measurement, the software believes it is transmitting on one path but is really driving a different path, possibly with a completely different geometry (i.e. path length) which could result in large flow errors.

Figure 2:
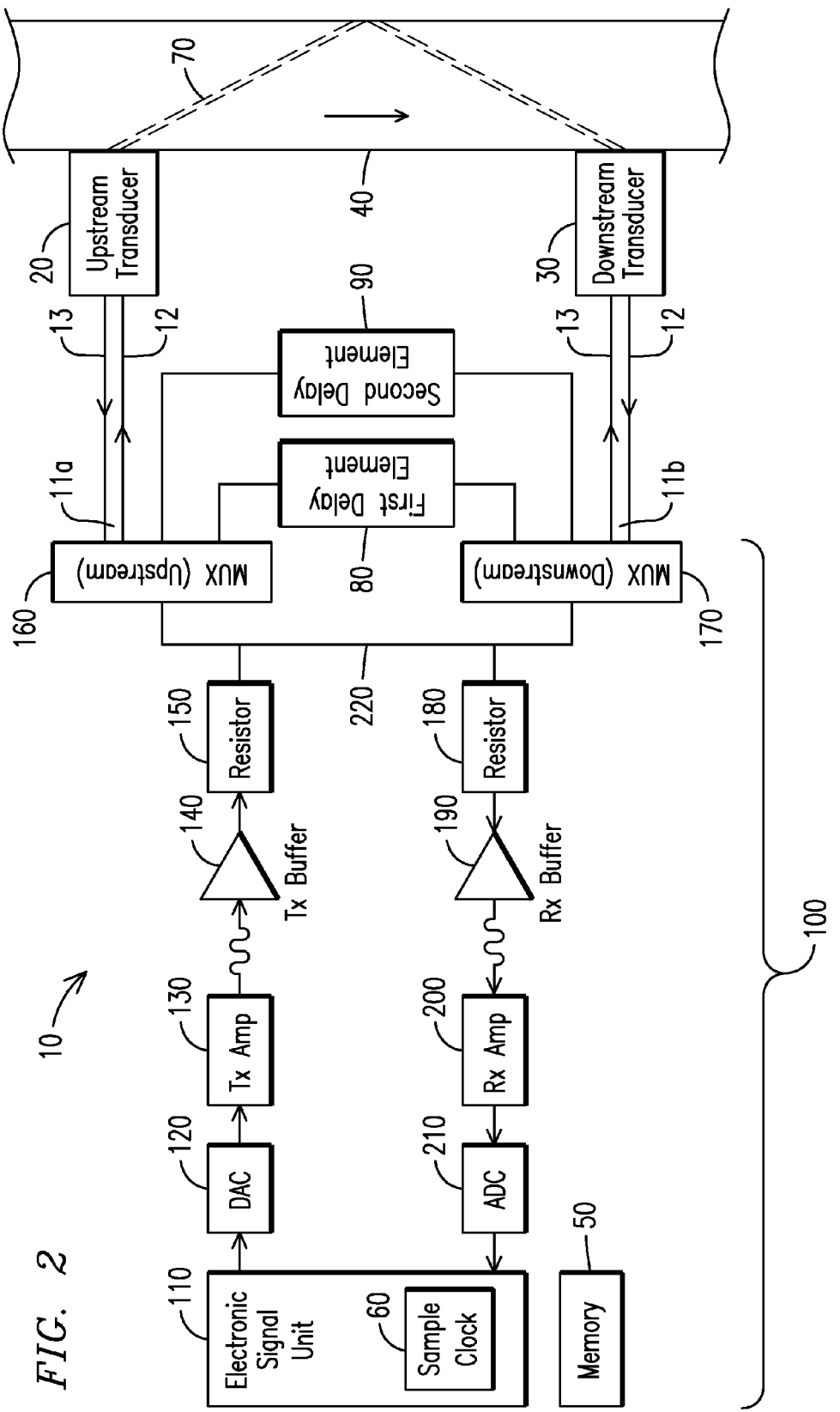
FIG. 2 shows a schematic representation of a simplified electric circuit of an ultrasonic transit-time flowmeter.

FIG. 2 shows a flowmeter 10, which can be a single-path or multi-path flowmeter, comprising path 11a and 11b. The path 11a connects to the upstream transducer 20 and path 11b to the downstream transducer 30. Each path 11a and 11b transmits signals in two directions 12 and 13 which are upstream and downstream as indicated by arrows at the paths 11a and 11b.

FIG. 2 further shows a simplified electric circuit within the controller 100 of the ultrasonic transit-time flowmeter 10. The controller 100 includes controlling and processing function and controls and/or processes signals and/or data.

The electronic circuit comprises an electronic signal unit 110 for generating, receiving, processing and storing digital signals. The unit 110 is shown as one component, but alternatively there may be separate software and/or hardware modules for generating digital signals, for receiving digitals signals, for processing/evaluating and/or storing the digital signals. The electronic signal unit 110 also comprises the sample clock 60. Further, the unit 110 may also comprise a calculation module for example for calculating the fluid flow velocity of the fluid within the pipe 40 based on the transit-times of the ultrasonic signals 70.

A Digital-Analog-Converter (DAC) 120 is connected to the unit 110 which converts a digital signal generated by the unit 110 into an analog signal, which is then transmitted via a Transmit-Amplifier (Tx Amp) 130, a Transmit-Buffer (Tx Buffer) 140 and a resistor 150 (for example a resistor for hazardous area explosion protection) to the upstream multiplexer (MUX) 160. The upstream multiplexer 160 switches between upstream and downstream direction, i.e. is configured either to transmit signals or to receive signals.

The upstream multiplexer 160 is connected to the upstream transducer 20, and the downstream multiplexer 170 is connected to the downstream transducer 30. In addition, both multiplexers 160 and 170 are electronically connected to each other as shown by the connection 220.

In one alternative, signals 70 are transmitted from the upstream transducer 20 to the downstream transducer 30 (reflected on a wall of the pipe 40), wherein the transducers 20 and 30 are embodied for example as piezoelectric crystals. The piezoelectric crystal of the transducer 20 mechanically oscillates after receiving the electrical energy of the signal transmitted via the upstream multiplexer (MUX) 160 and an ultrasonic beam is emitted. The reflected ultrasonic beam impacts the piezoelectric crystal of the downstream transducer 30 which creates electrical energy, i.e. an electrical analog signal, which is then forwarded to the downstream multiplexer 170. The signal received via the downstream multiplexer 170 is eventually transmitted to the electronic signal unit 110 via a resistor 180 (for example a resistor for hazardous area explosion protection), a Receive-Buffer (RX Buffer) 190, a Receive-Amplifier (Rx Amp) 200, and an Analog-Digital-Converter 210.

The multiplexers 160 and 170 operate in the same manner. After the first measurements have been taken, the direction is reversed such that the downstream transducer 30 sends an ultrasonic signal to the upstream transducer 20.

FIG. 2 further shows the delay elements 80 and 90 connected to the two multiplexers 160 and 170 in parallel to the upstream/downstream transducers 20 and 30. The delay elements 80 and 90 each comprise separate signal lines for connections to the multiplexers 160 and 170. The separate signal lines are signal lines in addition to the signal paths 11a and 11b which transmit signals from the multiplexers 160 and 170 to the transducers 20 and 30.

Alternating between the two delay elements 80 and 90 provides a predefined and very repeatable delta-time. Alternating means that the signals are sent alternately via the delay elements 80 and 90. Additionally, directions of the signals may also be alternated. For example, a first signal is sent from multiplexer 160 via delay element 80 to multiplexer 170. Then, a second signal is sent from the multiplexer 170 via delay element 90 to multiplexer 160. Alternatively, the first signal may be sent via the delay element 90 and the second signal vial the delay element 80.

For example, the multiplexer 160 transmits an analog signal to the delay element 80 which may be configured as a piezoelectric crystal with a delay time of 63 μsec. After the signal has traveled through the delay element 80, it is received by the downstream multiplexer 170 and eventually transmitted to the electronic signal unit 110. Then, another analog signal is sent by the multiplexer 160 to the second delay element 90, configured for example as another piezoelectric crystal with a delay time of 126 μsec, and is received by the downstream multiplexer 170 and eventually transmitted to the electronic unit 110. The electronic unit 110 then calculates the transit times of both signals and the delta-time of the two signals. If the delta-time corresponds to the expected delta-time, which is for this example 63 μsec, the flowmeter 10 works properly and the flowmeter 10 is in a faultless operating state.

Such a 'safety measurement' via the delay elements 80 and 90 can be done as often as required and the controller 100 is configured accordingly to route signals via the delay elements 80 and 90. 'Safety measurement' means that analog signals are routed via the delay elements 80 and 90 in order to find out if the flowmeter 10 is working properly without errors or failures in the hardware and/or software components of the flowmeter.

For example, 'safety measurements' may be done before each actual flow measurement. In this case, the electronic unit 110 and the multiplexers 160, 170 are configured such that it is alternated between 'safety measurements' and flow measurements. In another example, a safety measurement may be done every 100 conducted flow measurements (or whichever number of flow measurements is chosen). In another embodiment, the flowmeter 10 with controller 100 is configured such that a possible fault or defect within the flowmeter 10 is detected within a certain time frame. For example, a maximum time to detect a defect in the flowmeter 10 may be part of a requirement specification. In a further embodiment, a user of the flowmeter 10 can initiate a self-verification (self-check) by using a specific command or instruction which then triggers a measurement via the delay elements 80 and 90.

In a way, using the delay elements 80 and 90, a flow measurement is simulated. Instead of conducting an actual flow measurement in the pipe 40, signals are routed to the delay elements 80 and 90 used to determine for example a delta time—similar to determining a delta time based upon travel times of the ultrasonic signals 70 in the fluid of pipe 40.

The flowmeter device 10 will indicate to the user of the flowmeter 10, or to an automated control system, which can be part of the controller 100, that a failure has occurred.

The safety measurements may serve as a diagnostic function or Safety Integrity Function (SIF) for the multiplexers 160 and 170, the sample clock 60 and the amplifiers 130 and 200, where an incorrect signal amplitude, frequency, signal arrival time or delta-time would indicate a safety error condition. The very stable reference value of the delay elements 80 and 90 may also be used to evaluate operation of the transmit signal generation and receive signal amplifier, by verifying the measured frequency, gain value, signal amplitude and wave shape.

The reference delay elements verify the complete signal chain independent of the measurement process conditions, i.e. liquid attenuation, sound velocity, entrained gases for liquid etc.). This provides a true evaluation of the flowmeter electronics independent of the application and installed ultrasonic transducers. The delay elements are highly stable and repeatable such that any small deviation from the expected measurements may signal a deteriorating condition in the flowmeter electronics. The provided ultrasonic flowmeter describes a simple approach that tests the entire signal chain, including transmit signal generation, multiplexers, signal amplifiers, ADC, DAC and signal processing.

An electronic delay (instead of an acoustic delay as described with the delay elements 80 and 90) may also be considered as long as it is independent of the flow measurement timing clock (sample clock 60). The electronic delay may be a separate electronic entity but could also be constructed as a sub-circuit of the existing electronic resources, for example the controller 100, of the flowmeter 10.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

LIST OF REFERENCE NOS

10 Flowmeter
11a, 11b Path
12 Direction 1
13 Direction 2
20 Upstream transducer
30 Downstream transducer
40 Pipe
50 Memory
60 Sample clock
70 Ultrasonic signal
80 First delay element
90 Second delay element
100 Electronic controller (controlling and processing)
110 Electronic signal unit
120 DAC
130 Tx Amp
140 Tx Buffer
150 Tx Resistor
160 Upstream MUX
170 Downstream MUX
180 Rx Resistor
190 Rx Buffer
200 Rx Amp
210 ADC

We claim:
1. Ultrasonic transit-time flowmeter comprising:
a first ultrasonic transducer and a second ultrasonic transducer, wherein the first and second transducers are each configured to transmit and receive signals;
an electronic controller, wherein the first and second ultrasonic transducers are connected to the electronic controller; and
a first acoustic delay element and a second acoustic delay element, the first and second acoustic delay elements comprising piezoelectric crystals bonded to a glass plate, wherein the first and second acoustic delay elements are connected to the electronic controller and each provide a reference signal, wherein the electronic controller is configured to:

store a predetermined value in a memory of the electronic controller, compare a reference value based upon the reference signals with the predetermined value, and identify a failure of the ultrasonic flowmeter based upon a comparison of the reference value with the predetermined value.

2. The ultrasonic transit-time flowmeter as claimed in claim 1, wherein the electronic controller is configured to compare the predetermined value with the reference value.

3. The ultrasonic transit-time flowmeter as claimed in claim 2, further comprising:

an output, wherein the electronic controller is configured to place the output into an operating state which indicates that a failure has occurred when the reference value fails to correspond to the predetermined value.

4. The ultrasonic transit-time flowmeter as claimed in claim 1, wherein the first and second acoustic delay elements each have a different delay time, and wherein a time difference between the different delay times is the predetermined value.

5. The ultrasonic transit-time flowmeter as claimed in claim 1, wherein the first and second acoustic delay elements are located inside an enclosure of the ultrasonic flowmeter.

6. The ultrasonic transit-time flowmeter as claimed in claim 1, wherein the first and second acoustic delay elements are located in a separate enclosure outside an enclosure of the ultrasonic flowmeter.

7. Method for detecting a failure in an ultrasonic transit-time flowmeter comprising:

providing a first ultrasonic transducer and a second ultrasonic transducer, wherein the first and second transducers are each configured to transmit and receive signals;

storing a predetermined value in a memory of an electronic controller, the first and second ultrasonic transducers being connected to the electronic controller;

providing reference signals by a first acoustic delay element and a second acoustic delay element, the first and second acoustic delay elements comprising piezoelectric crystals bonded to a glass plate;

determining a reference value based upon the reference signals;

comparing the reference value with the predetermined value; and identifying an error within the ultrasonic flowmeter based upon a comparison of the reference value and the predetermined value.

8. The method as claimed in claim 7, wherein the reference signals are provided as outputs of the first and second acoustic delay elements with a time delay.

9. The method as claimed in claim 8, further comprising:

providing the reference signals in an alternating manner by operating the first and second acoustic delay elements in an alternating manner;

determining transit times of the reference signals; and determining a time difference based upon the transit times of the reference signals;

wherein the time difference is compared to the predetermined value.

10. The method as claimed in claim 9, wherein each acoustic delay element comprises a different delay time.

11. The method as claimed in claim 10, wherein a time difference between the different delay times of the delay elements is stored as the predetermined value.

12. The method as claimed in claim 7, further comprising:

placing an output of the ultrasonic flowmeter into an operating state which indicates that a failure has occurred when the reference value fails to correspond to the predetermined value.

* * * * *